Supcoe et al.

[11] 4,289,677
[45] Sep. 15, 1981

[54] FORMULATION FOR PRODUCING LOW INFRARED COATING IN THE 2-15 MICRON RANGE

[76] Inventors: Robert F. Supcoe, 1227 Mt. Pleasant, Rt. 9; Melvin Greenberg, 314 Dewey Dr., both of Annapolis, Md. 21401

[21] Appl. No.: 73,815

[22] Filed: Sep. 10, 1979

Related U.S. Application Data

[63] Continuation-in-part of Ser. No. 173,940, Aug. 23, 1971, abandoned.

[51] Int. Cl.$^3$ .................... C09D 3/82; C09D 5/32; C09D 5/38
[52] U.S. Cl. .................... 260/33.6 SB; 106/253; 106/290; 106/300; 106/308 M; 250/353; 260/37 SB; 428/405; 428/407
[58] Field of Search .................... 106/253, 262, 263, 264, 106/290, 300, 308 M; 343/18 R, 18 A, 18 B; 260/225, 185, 33.6 SB, 37 SB; 250/353; 428/391, 390, 405, 407

[56] References Cited

U.S. PATENT DOCUMENTS

| | | | |
|---|---|---|---|
| 2,523,065 | 9/1950 | Sace | 260/22 S |
| 2,587,295 | 2/1952 | Doyle et al. | 260/22 S |
| 2,663,694 | 12/1953 | Millar | 260/22 S |
| 2,718,508 | 9/1955 | Rauner | 260/22 S |
| 2,724,704 | 11/1955 | Millar | 260/22 S |
| 2,941,894 | 6/1960 | McAdow | 106/290 |
| 2,980,638 | 4/1961 | Polovina | 106/290 |
| 2,996,710 | 8/1961 | Pratt | 343/18 A |
| 3,110,691 | 11/1963 | Fisher, Jr. | 106/290 |
| 3,234,038 | 2/1966 | Stephens et al. | 106/290 |
| 3,448,268 | 6/1969 | Proctor | 250/353 |
| 4,011,190 | 3/1977 | Telkes | 260/33.6 SB |

*Primary Examiner*—Teddy S. Gron
*Attorney, Agent, or Firm*—R. S. Sciascia; L. A. Marsh; W. W. Randolph

[57] ABSTRACT

A low infrared emitting coating for use on metal surfaces and compatible with both organic and inorganic binders. The coating is of a color corresponding to the standard Navy haze-gray color and exhibits an infrared reflectance in excess of the standard Navy haze paint.

4 Claims, 1 Drawing Figure

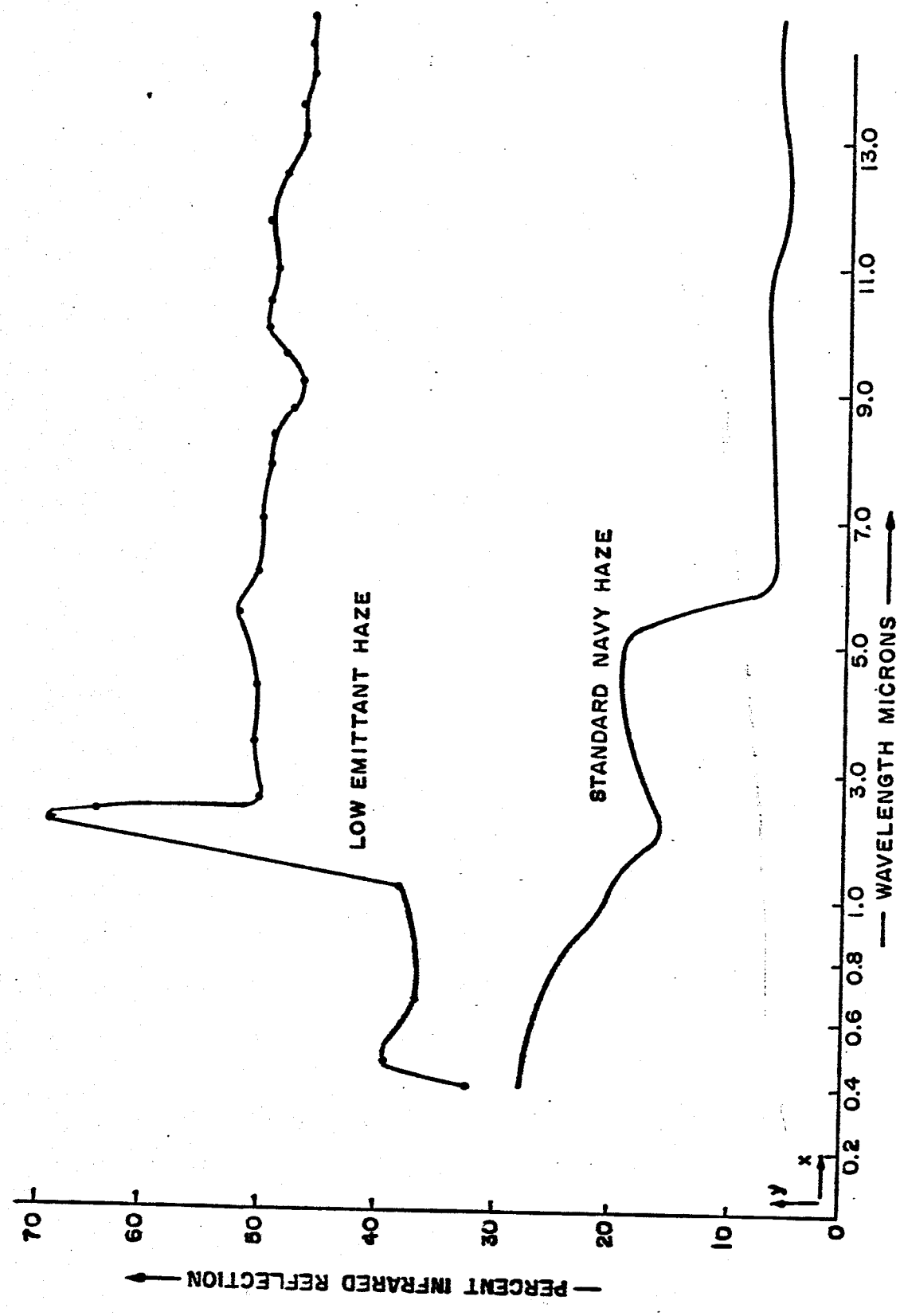

FORMULATION FOR PRODUCING LOW INFRARED COATING IN THE 2-15 MICRON RANGE

The invention described herein may be manufactured and used by or for the Government of the United States of America for Governmental purposes without the payment of any royalties thereon or therefor.

This case is a continuation in part of Ser. No. 173,940 filed Aug. 23, 1971, now abandoned.

BACKGROUND OF THE INVENTION

This invention relates to a coating for surfaces and in particular to a coating having high infrared solar reflectance properties.

Previously used camouflage coatings or paint, especially for use on hulls of Naval vessels, exhibit relatively high solar absorption because of the dark colors and diffused finishes characteristic of the coatings. High solar absorption necessarily results in high surface temperatures which increase cooling requirements and more importantly increase infrared radiation. In modern warfare infrared detection techniques have become highly developed and means for counter-detection techniques are required. Artificial cooling of hot exposed surfaces is effective to reduce infrared emission. However, this method increases electrical power requirements aboard ship as well as adding parasitic weight and volume to equipment aboard the ship.

This invention provides a durable opaque coating suitable for use on exposed surfaces of Naval vessels or on the very hot surfaces of a gas turbine exhaust. Such coated surfaces exhibit low reflectance, in the visual portion of the light wave lengths and high reflectance in the infrared portion. Thus, the coating of this invention materially reduces the surface heating while at the same time provides for protection against infrared detection and visual camouflage.

SUMMARY OF THE INVENTION

The invention described herein provides a stable, moderately dark paint or other type of coating suitable for use on exterior surfaces which are desired to be of low luminous reflectance and have a high solar infrared reflectance with low infrared emittance properties.

The coating is a diffused gray coating of non-metallic texture having a significantly reduced infrared emittance. The pigment system is compatible with both organic and inorganic binders. The inorganic binder provides a coating that may be of value in the coating of very hot surfaces, such as a gas turbine exhaust. Both the inorganic and organic coating binders are also of use in camouflage techniques and situations where it is desirable to reduce the level of infrared emission and retain visual camouflage. The infrared emittance of this coating is approximately 47-49% less than a standard Navy gray coating (STD Navy Haze 8010-285-8298) over the 0.3-15 micron spectral range.

It is, therefore, an object of this invention to provide an exterior opaque coating having a low luminous reflectance, low solar absorption with low infrared emittance.

It is another object of this invention to provide a dark or moderately dark exterior coating having a low luminous reflectance and high infrared reflectance as well as visual camouflage characteristics.

BRIEF DESCRIPTION OF THE DRAWING

The FIGURE shown is a graph comparing the infrared reflectance of the aforementioned standard Navy haze to the reflectance of the coating of this invention over the 0.3-15 micron spectral range.

DESCRIPTION OF THE PREFERRED EMBODIMENT

Exterior paint coatings, especially those used on exterior surfaces of Navy vessels, are typically light gray to dark gray in color. In addition to providing a protective coating to prevent corrosion and similar deterioration of the metal hull, these coatings must also provide visual camouflage for vessels at sea. A dark coating having a diffused finish to inhibit visual reflection also exhibits high solar absorbance resulting in heating of the surfaces.

In modern warfare techniques one of the principle methods used for detection of Navy vessels is by infrared sensors. It is well known that the infrared radiation of a surface is directly affected by the surface temperature and also by the character of the surface finish. This invention provides a painted coating on the surface finish. This invention also provides a painted coating and a method of making such a coating which provides physical protection and camouflage for a vessel hull while at the same time materially reducing surface heating and infrared emittance.

The color and other optical properties of the coating are due principally to the characteristics of the pigments and fillers used in compounding the coating, to a lesser extent to the binder, and to a negligible extent to other materials, constituting less than 1% by weight of the paint.

A typical formulation essentially consists of the mixture of the following constituents of about by weight:

| | |
|---|---|
| Coarse non-leafing aluminum powder (eg. Reynolds 4-501 by Reynolds Metal; MIL-A-512-A, Type 1, Grade B, Class 2.) | 10-22% |
| Cobalt metal (certified chemically pure powder) | 2-15% |
| Cobalt oxide (certified chemically pure powder) | 2-5% |
| Titanium dioxide (eg. Titanox by DuPont; pigment grade, 325 mesh.) | 7-23% |
| Silicone alkyd resin | 65-75% |
| Polarized montmorrilite clay (eg. Bentone No. 27 by National Lead.) | 1-4% |

The aforementioned polarized montmorrilite clay exemplifies a dispersing agent for suspending the pigment materials of aluminum powder, cobalt metal, cobalt oxide and titanium dioxide in the silicone alkyd resin and preventing said pigment materials from settling out of suspension.

The aforementioned constituents are mixed together, ball milled to a Hegman fineness of about 6. The mixture is then let down or thinned with mineral spirits to suitable brushing or spraying viscosity.

In particular properties of silicone alkyd resins are well known as shown by reference to the following publications:

(1) Modern Surface Coatings—Nylon and Sunderland, published 1965 by Interscience Publishers, a division of John Wiley & Sons Ltd., New York.

(2) The Encyclopedia of Basic Materials for Plastics—edited by Simmons and Church. Published by Reinhold Publishing Corp., New York.

(3) Dow Corning Bulletin: 03-031, dated May 1967. Information about Silicone Protective Coating Resins.

(4) Alkyd Resin Technology, Formulating Techniques and Allied Calculations published 1962 by Interscience Publishers, a division of John Wiley & Sons Ltd., New York (pp. 164–171).

The silicone alkyd resin is of the type specified in the Federal Specification TT-E-00490B of Oct. 23, 1969. Such silicone alkyd resins are further illustrated by the Dow Corning XR-6-2165 Resin (dated January, 1967) having the following ingredients:

| Formulation, Two-State - 96% Solids | |
|---|---|
| Ingredients | Parts |
| (a) Pentacrythritol (mono) | 7.45 |
| (b) Glycerol (synthetic) | 1.36 |
| (c) Phthalic anhydride | 9.72 |
| (d) Soya fatty acid | 26.33 |
| (e) Xylene | .37 |
| (f) Silicone Intermediate (Dow Corning Z-6018) | 18.96 |
| (g) Xylene | .37 |
| (h) Stoddard solvent | 35.44 |
| | 100.00 |

The formulation procedure is as follows:

1. Add (a), (b), (c), (d), and (e) to a flask and slowly heat the mixture to 230° C. with good agitation and a nitrogen purge. Water formed during the reaction is removed as it forms.

2. When the temperature of the mixture of step 1 reaches 230° C., the reaction is followed by taking acid number readings every 30 minutes. The reaction is complete when the acid number is between 7 and 9.

3. The alkyd mixture of step 2 is cooled to 180° C. and the silicone intermediate (eg. Z-6081) is then added. (The temperature is reduced before adding the Z-6018 because the Z-6018 will react too quickly with the alkyd at 230° C. and cause some gellation. It may be desirable to reduce the alkyd temperature to 150° C. or lower, depending on the size of the inlet funnel. The Z-6018 will melt on the sides of small funnels at temperatures above 150° C.) After the Z-6018 is added, the temperature is increased to 190°–200° C. with a good xylene reflux. The final end point is determined by the desired viscosity. A guideline which can be used to determine completeness of reaction is the amount of water removed. The reaction should be complete when 4% water, based on the total weight of Z-6018 used, has been removed.

4. The resin is then cooled to 180° C. and the (h) Stoddard Solvent added to reduce the resin solids to 60%. The thinner comprises any conventional solvent such as: petroleum spirits, etc.

These resins are specified to be silicone long oil soya alkyd copolymers with air drying properties having characteristics as follows:

| Federal Specification TT-E-00490B | | |
|---|---|---|
| Charactistics of | Requirements | |
| Silicone-Alkyd Copolymer Resin | Minimum | Maximum |
| Vehicle solids, percent by weight of silicone-alkyd resin | 58 | 62 |
| Viscosity | V | Z |
| Color | — | 13 |
| Phthalic anhydride, percent by weight of silicone alkyd resin | 15 | — |
| Drying oil acids, percent by weight of silicone-alkyd resin | 44 | 54 |
| Unsaponifiable matter, percent by weight of silicone-alkyd resin | — | 1.0 |
| Silicone content, percent by weight of silicone-alkyd resin | 30 | — |
| Acid number of silicone-alkyd resin | — | 12 |

Referring now to the FIGURE, the Y axis is entitled percent infrared reflectance and is scaled from 0–70% and the X axis is the spectral wavelength expressed in microns from 0.2–15. As can be seen from the FIGURE and realizing the percent emittance and the percent reflectance equals unity, the infrared emittance values of the Standard Navy Haze are considerably in excess of the infrared emittance value of the low emittance coating.

As shown in the Table below, solar absorbance of the low emittance haze is comparable to that of the standard (STD) Navy Haze over the 0.3–1.8 micron range. The average values of luminous reflectance, and tristimulus color coordinates are similarly comparable producing approximately the same visual characteristics for both the low emittance and the Standard Navy Haze.

As further seen in the following Table 1, the infrared emittance of the low emittance haze is less than that of the STD Navy Haze over the ranges of 3–5 microns, 8–14 microns and for the respective average values of each over the range of from 0.2 to 15 microns.

TABLE I

| | STD Navy Haze | Low Emittance Haze |
|---|---|---|
| $E_s$ | 0.751 | 0.623 |
| $E_{3-5}$ | 0.797 | 0.457 |
| $E_{8-14}$ | 0.936 | 0.513 |
| $E_T$ | 0.931 | 0.511 |
| Y | 25.9 | 38.5 |
| x | 0.306 | 0.308 |
| y | 0.317 | 0.315 |

The $E_s$ is solar absorbance over the 0.3 to 1.8 micron range;

$E_{3-5}$ is the infrared emittance over the 3–5 micron range;

$E_{8-14}$ is the infrared emittance over the 8–14 micron range;

$E_T$ is the average infrared emittance over the 2–15 micron range;

Y is luminous reflectance; and x and y are the tristimulus color coordinates.

Obviously many modifications and variations of the present invention are possible in the light of the above teachings. It is therefore to be understood that within the scope of the appended claims the invention may be practiced otherwise than as specifically described.

What is claimed is:

1. A diffuse gray coating mixture having a low infrared emittance and comprising by weight:

from about 10% to about 22% coarse non-leafing aluminum powder;
from about 2% to about 15% cobalt metal;
from about 2% to about 5% cobalt oxide;
from about 7% to about 20% titanium dioxide;
from about 65% to about 75% silicone alkyd resin and from about 1% to about 4% polarized montmorrilite clay.

2. The coating mixture of claim 1, wherein said coating mixture is thinned with a mineral spirits thinner.

3. The coating mixture of claim 1, wherein the particles of said coating mixture have a particle fineness of less than 6 Hegman scale.

4. A diffuse gray coating mixture having a low infrared emittance and comprising by weight:
from about 10% to about 22% non-leafing aluminum powder;
from about 2% to about 15% cobalt metal;
from about 2% to about 5% cobalt oxide;
from about 7% to about 20% titanium dioxide;
from about 65% to about 75% silicone alkyd resin and from about 1% to about 4% dispersing agent for suspending the pigment materials of aluminum powder, cobalt metal, cobalt oxide and titanium dioxide in the silicone alkyd resin and preventing said pigment materials from settling out of suspension.

* * * * *